US010857888B2

(12) United States Patent
Falke et al.

(10) Patent No.: US 10,857,888 B2
(45) Date of Patent: Dec. 8, 2020

(54) ELECTRICAL SYSTEM OF A RAIL VEHICLE, RAIL VEHICLE, AND PROCESS FOR OPERATING AN ELECTRICAL SYSTEM

(71) Applicant: Bombardier Transportation GmbH, Berlin (DE)

(72) Inventors: Ewald Falke, St. Gallen (CH); André Rickermann, Lenzburg (CH)

(73) Assignee: Bombardier Transportation GmbH, Berlin (DE)

(*) Notice: Subject to any disclaimer, the term of this patent is extended or adjusted under 35 U.S.C. 154(b) by 251 days.

(21) Appl. No.: 16/305,269

(22) PCT Filed: May 29, 2017

(86) PCT No.: PCT/EP2017/062910
§ 371 (c)(1),
(2) Date: Nov. 28, 2018

(87) PCT Pub. No.: WO2017/207498
PCT Pub. Date: Dec. 7, 2017

(65) Prior Publication Data
US 2020/0254881 A1 Aug. 13, 2020

(30) Foreign Application Priority Data
Jun. 1, 2016 (DE) .................. 10 2016 209 553

(51) Int. Cl.
B60L 3/00 (2019.01)
B61C 3/00 (2006.01)
B61C 17/04 (2006.01)

(52) U.S. Cl.
CPC .............. *B60L 3/0023* (2013.01); *B61C 3/00* (2013.01); *B61C 17/04* (2013.01); *B60L 2200/26* (2013.01)

(58) Field of Classification Search
CPC ...... B60L 3/0023; B60L 2200/26; B61C 3/00; B61C 17/04
See application file for complete search history.

(56) References Cited

U.S. PATENT DOCUMENTS

| 9,018,792 | B2 | 4/2015 | Still |
| 10,112,490 | B2 | 10/2018 | Detterbeck |
| 2011/0316333 | A1 | 12/2011 | Still |
| 2014/0338558 | A1 | 11/2014 | Luebben et al. |
| 2017/0136884 | A1 | 5/2017 | Detterbeck |

FOREIGN PATENT DOCUMENTS

| DE | 102009008549 A1 | 8/2010 |
| DE | 102014213073 A1 | 1/2016 |
| EP | 0514580 A1 | 11/1992 |

(Continued)

Primary Examiner — Robert L Deberadinis
(74) Attorney, Agent, or Firm — The Webb Law Firm

(57) ABSTRACT

The invention relates to an electrical system of a rail vehicle, the electrical system comprising a first power converter, at least one other power converter, and at least one transformer, an intermediate circuit section of the first power converter being electrically connectable, by at least one intermediate circuit electrical connection, with an intermediate circuit section of the at least one other power converter, the at least one part of the electrical intermediate circuit connection being routed through a transformer case, as well as a rail vehicle and a process for operating the electrical system.

13 Claims, 3 Drawing Sheets

(56) References Cited

FOREIGN PATENT DOCUMENTS

Figure 3:
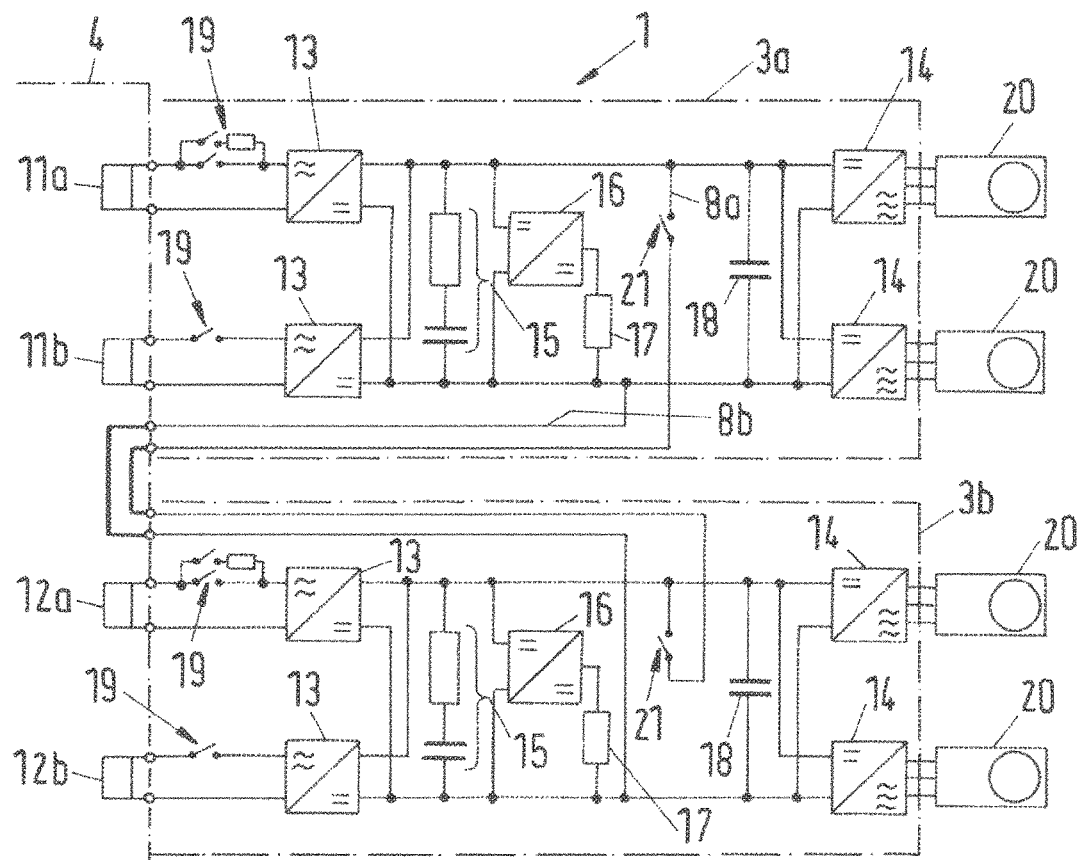

| | | |
|---|---|---|
| EP | 1958843 A1 | 8/2008 |
| JP | 2010871 A | 1/2010 |
| JP | 2013192408 A | 9/2013 |
| WO | 2007031245 A1 | 3/2007 |
| WO | 2012098107 A2 | 7/2012 |

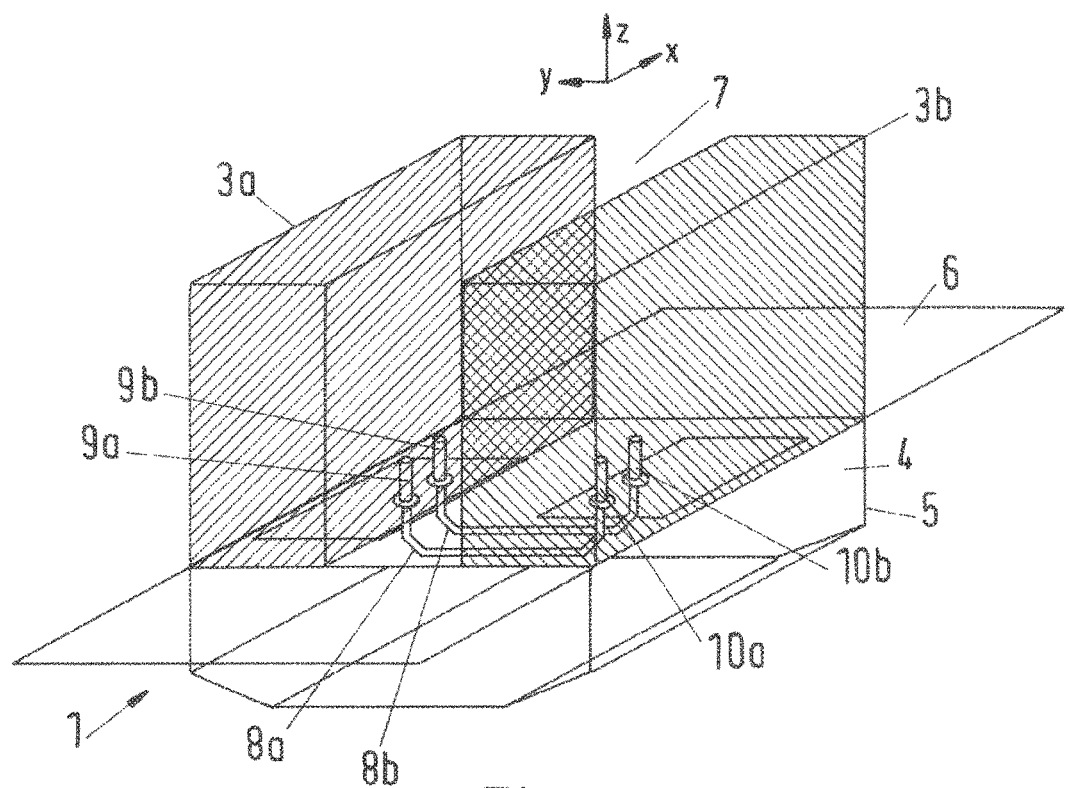
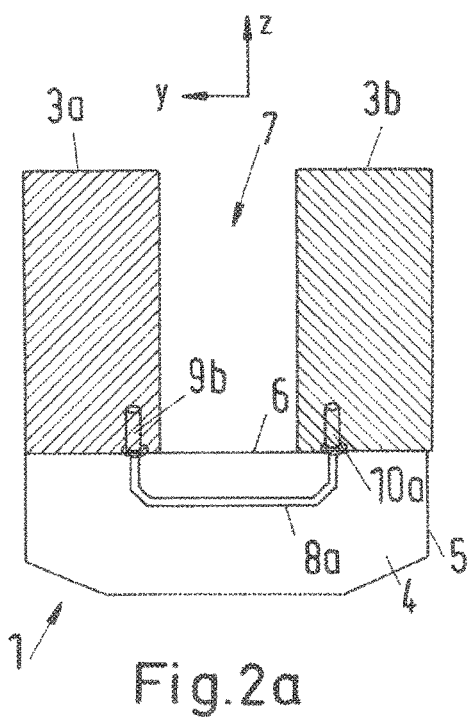 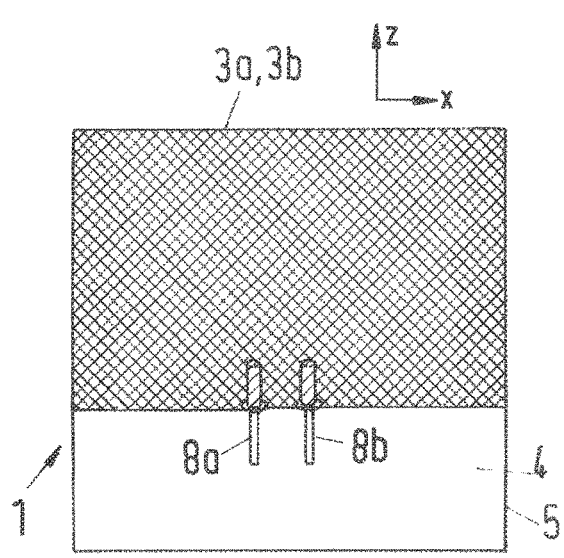

ELECTRICAL SYSTEM OF A RAIL VEHICLE, RAIL VEHICLE, AND PROCESS FOR OPERATING AN ELECTRICAL SYSTEM

CROSS-REFERENCE TO RELATED APPLICATIONS

This application is the United States national phase of International Application No. PCT/EP2017/062910 filed May 29, 2017, and claims priority to German Patent Application No. 10 2016 209 553.6 filed Jun. 1, 2016, the disclosures of which are hereby incorporated in their entirety by reference.

The invention relates to an electrical system of a rail vehicle, a rail vehicle, and a process for operating the electrical system.

WO 2007/031245 A1 discloses a locomotive with multiple specimens of power converters, which can be separated by a central passage through which a person can walk.

During the operation of such a locomotive, problem scenarios can arise in which at least one of the power converters no longer has the desired functionality. For example, a line current power converter or a motor converter of the power converter can fail.

In such a operating scenarios, it is desirable to minimize the undesired reduction in the functionality of the rail vehicle. In particular, in such operating scenarios it is desirable that a maximum tractive power not be reduced. Furthermore, it is desirable that it be possible to minimize this undesired reduction while minimizing the space requirement for a corresponding solution. In particular, functionality should be improved, especially in the case of the previously explained failure, without this requiring additional space, or requiring only minimum additional space.

The solution of the technical problem follows from the objects with the features of claims 1, 7, and 12. Thus, the technical problem is to create an electrical system of a rail vehicle, a rail vehicle, and a process for operating the electrical system that allow improved functionality of the rail vehicle while minimizing the space requirements required for this.

What is proposed is an electrical system of a rail vehicle. This electrical system can form part of a traction system of the rail vehicle. The electrical system can also be designated as an arrangement of electrical components of the rail vehicle.

In particular, the electrical system can be an electrical system of a locomotive. This can be understood to be a rail vehicle that can, in particular, move a train of multiple coupled cars in pull operation or push operation. The locomotive can have facilities that distinguish the locomotive from passenger cars and freight cars, e.g., at least one engineer's cabin and/or other facilities that allow operation of the locomotive and/or of the train.

A locomotive can also be understood to be a driving unit for a rail vehicle train.

The locomotive can have an engine room in which one or more power plant(s), especially electric engines, and auxiliaries can be arranged.

The electrical system comprises a first power converter, at least one other power converter and at least one transformer.

This transformer can have at least one primary winding, which is electrically connectable, for example, with a supply voltage, in particular a line voltage. The supply voltage can be provided, e.g., through an overhead wire. This overhead wire can make contact with a current collector, for example. Thus, the primary winding can be electrically connected or connectable with the current collector. Furthermore, the transformer can have at least one, preferably multiple secondary winding(s). Preferably, the transformer has one, preferably multiple, secondary winding(s) per power converter.

The components of the transformer, especially the primary winding and the at least one secondary winding, can be arranged in a transformer case. Thus, the transformer case comprises the elements of the transformer. The transformer case can also have transformer oil arranged in it, at least in a subarea of it.

Here a power converter can refer to a device that connects the transformer and other electrical devices of the rail vehicle. Other electrical devices can be, for example, electrical power plants and auxiliary devices, for example devices of a ventilation and/or lighting system.

Here a power converter can comprise one or more of the following components:
- at least one line current power converter;
- at least one drive power converter;
- at least one braking controller device;
- at least one auxiliary converter;
- at least one switching device for breaking or changing electrical connections of the power converter;
- at least one intermediate circuit capacitance;
- at least one filter device;
- at least one discharge resistor.

The components of the power converter can also be designated as functional subdevices of the power converter. The components can be electrically connected with one another in a desired way.

Furthermore, the power converter can have at least one terminal for connection with a secondary winding of the transformer. Preferably, a power converter has multiple, for example two, terminals for connection with multiple secondary windings of the transformer.

Furthermore, a power converter can have a terminal for an external energy storage device, for example an accumulator or a battery.

Furthermore, a power converter can have a terminal for an external generator device, for example a generator.

Furthermore, the power converter can have at least one terminal for an electric engine, in particular a power plant.

Furthermore, the power converter can have a terminal for at least one auxiliary device.

Furthermore, a power converter has an intermediate circuit section. The intermediate circuit section can designate a direct voltage section in the power converter. For example, an intermediate circuit section can designate the electrical subsystem of the power converter that connects the direct voltage terminals of a line current power converter with direct voltage terminals of a drive power converter.

In particular, the intermediate circuit section can comprise the intermediate circuit capacitance, which can be in the form of an intermediate circuit capacitor, for example. The intermediate circuit can provide an intermediate circuit voltage. This intermediate circuit voltage can designate, for example, the voltage drop across the intermediate circuit capacitance.

According to the invention, an intermediate circuit section of the first power converter is electrically connectable, by at least one intermediate circuit electrical connection, with an intermediate circuit section of the at least one other power converter. This can mean that an electrical connection can be made and broken between the intermediate circuit sections of different power converters. To break and make the connection, the intermediate circuit connection can comprise or have at least one switching device, in particular a disconnecting switching device.

In particular, a high-voltage section of the intermediate circuit section of the first power converter can be connectable, through a first intermediate circuit electrical connection, with a high-voltage section of the intermediate circuit section of the at least one other power converter, a low voltage section of the intermediate circuit section of the first power converter being connectable or connected, through another intermediate circuit electrical connection, with a low voltage section of the intermediate circuit of the at least one other power converter. Here the first or other intermediate circuit electrical connection can have a switching device to make or break the electrical connection.

Here a high-voltage section designates a section of the intermediate circuit section that has a higher electric potential than the low voltage section. For example, a first terminal of the intermediate circuit capacitance can be connected with the high-voltage section and a second terminal of the intermediate circuit capacitance can be connected with the low voltage section.

Furthermore, at least one part of the intermediate circuit electrical connection is routed through a transformer case. This can mean that at least one part of the intermediate circuit electrical connection is arranged in/passes through the transformer case.

In particular, an intermediate circuit connection can comprise one or more power converter-internal part(s) and a transformer-internal part. Here power converter-internal parts are arranged in a housing of a power converter. The transformer-internal part is arranged in the transformer case or is routed through the transformer case.

The intermediate circuit connection can also comprise one or more part(s) that is/are arranged outside a housing of the power converter and outside the transformer case. In particular, however, it is possible for the part of the intermediate circuit electrical connection that is arranged outside the housing of the power converter to be arranged completely inside the transformer case.

It is possible for the transformer to have one terminal for connection of the transformer-internal part of the intermediate circuit connection with the intermediate circuit section of the first power converter and at least one other terminal for connection of the transformer-internal part of the intermediate circuit section with the intermediate circuit section of the at least one other power converter.

The fact that at least one part of the intermediate circuit electrical connection is routed through the transformer case can also mean that the at least one part is routed along an inner wall or along an outer wall of the transformer case.

The electrical connection between the intermediate circuits advantageously allows electric power to be transferred between the power converters, in particular between their intermediate circuit sections. As will be explained in greater detail below, this in turn advantageously improves the functionality of the power converter(s) in certain operating scenarios, especially in the case of certain failures.

It also advantageously minimizes the space and installation requirements for making this electrical connection. In particular, it is not necessary to lay an additional electrical connection between the power converters in the rail vehicle outside of existing devices. Alternatively, it can minimize the length of such device-external connections.

In another embodiment, at least one part of the intermediate circuit electrical connection is in the form of a current bus. A current bus can consist of electrically conductive metal, for example of aluminum, copper, or steel. A current bus can be a bend-resistant component, in particular it can be more bend-resistant than an electrical cable. Furthermore, a current bus can be in the form of a rolled steel section. In particular, the transformer-internal part of the intermediate circuit connection can be in the form of a current bus.

This advantageously produces a mechanically robust intermediate circuit connection.

In another embodiment, at least one part of the intermediate circuit electrical connection is in the form of a cable. This advantageously produces a flexible spatial arrangement or cable routing of the intermediate circuit connection.

It is conceivable for one part of the intermediate circuit electrical connection to be in the form of a cable and another part to be in the form of a current bus.

In another embodiment, at least one part of the intermediate circuit electrical connection, in particular the transformer-internal part, is electrically insulated. E.g., at least one part of the intermediate circuit connection or the entire intermediate circuit connection can be surrounded by a layer of insulation. In particular, the intermediate circuit electrical connection is electrically insulated from the transformer, especially from electrical or electronic elements of the transformer. This advantageously increases the operational reliability of the electrical system.

In another embodiment, at least one part of the intermediate circuit electrical connection, especially the transformer-internal part or a section of the transformer-internal part, is surrounded by an insulation material of the transformer.

This can involve at least part of the volume of the transformer case being filled with the insulating material, for electrical insulation of the electrical elements of the transformer, especially the primary winding and the at least one secondary winding. Arranging at least one part of the intermediate circuit connection in the insulating material also electrically insulates this part from an environment.

The insulating material can be a solid material, e.g., glass, mica, ceramic, or hard paper, or it can consist of a mixture of at least two of these materials. The insulating material can also be a gaseous material, e.g., an insulating gas or a mixture of insulating gasses. The insulating material can also be a liquid material.

In a preferred embodiment, the insulating material is a transformer oil. Thus, at least one part of the intermediate circuit electrical connection, especially the transformer-internal part or a section of the transformer-internal part, is surrounded by transformer oil of the transformer.

Here at least part of the volume of the transformer case can be filled with the transformer oil, for electrical insulation of the electrical elements of the transformer, especially the primary winding and the at least one secondary winding, and to provide a thermal connection for cooling. Arranging at least one part of the intermediate circuit connection in the transformer oil also electrically insulates this part from an environment and allows it to be cooled.

Further proposed is a rail vehicle that has an electrical system according to one of the embodiments described in this disclosure. The rail vehicle can be, in particular, a locomotive. Of course the rail vehicle can comprise other rail vehicle components in addition to the electrical system.

In particular, the rail vehicle can have a high-voltage supporting structure. A high-voltage supporting structure can be understood to mean a device in which electrical components and electric lines for a high-voltage part of an energy supply are arranged. In particular, the high-voltage supporting structure can also be a so-called power converter supporting structure, in which case the supporting structure has exclusively or additionally components and lines of a power converter arranged in it.

This advantageously improves the functionality of a rail vehicle, especially in the case of certain failures, while simultaneously not increasing the space required for installing the electrical system in the rail vehicle, or increasing it only minimally.

In another embodiment, the first and the at least one other power converter are arranged spaced apart from one another in at least one spatial direction. The at least one spatial direction can be, in particular, a direction parallel to a transverse axis of the vehicle. The transverse axis of the vehicle can also be designated as a pitch axis of the vehicle. In particular, power converter supporting structures or the housings of the power converters with the power converters arranged in them can also be arranged spaced apart from one another in the at least one spatial direction.

In particular, this distance can be selected so that a person can walk through between the power converters. Thus, a distance can be greater than 0.6 m, for example.

This has the advantageous result that the bridging of the distance between the power converters that is necessary for electrical connection of the intermediate circuit sections is at least partly performed by a connection route in the transformer case, thus eliminating the need for an additional connection route, which is expensive and requires a lot of space.

In another embodiment, the rail vehicle has a central passage, and the transformer is arranged beneath it. Furthermore, power converters can be arranged on opposite sides of the central passage.

The rail vehicle can have or form, for example, a base plate whose upper surface forms a floor of the central passage. In this case, the transformer can be arranged beneath this base plate. For example, a top of the transformer can lie against, or be mechanically connected with the bottom of the base plate. It is also possible for the transformer to be an underfloor transformer.

In this case, the power converter can be arranged above the base plate. For example, it is possible for the power converters, in particular their housings or supporting structures, to be arranged on the surface of the base plate and/or surround the central passage.

The statement that the transformer is arranged under the central passage can mean that the transformer is arranged under the central passage in a vertical direction that is oriented parallel to a vertical axis of the rail vehicle, from a bottom to a top of the rail vehicle. Other indications of direction such as, e.g., "above" can also relate to the vertical direction.

It is possible for the transformer case to extend from an area under the first power converter to an area under the other power converter. Thus, the transformer case bridges the distance between the power converters.

Arranging the transformer under the central passage advantageously produces an especially space-saving arrangement of components of the electrical system in the rail vehicle.

In another embodiment, at least one cable routing device is arranged between a floor element of the central passage, for example, the previously explained base plate, and a top of the transformer, the cable routing device lying flush against the floor element and against the top of the transformer. This cable routing device can extend along or parallel to a longitudinal axis of the rail vehicle. In particular, the cable routing device can be in the form of a cable channel.

The cable routing device can have, for example, supply lines, for example compressed air lines, and other elements, e.g., signal connection elements and electrical connection elements routed through it. Routing the intermediate circuit connection through the transformer has the advantageous result that such a cable routing device does not require structural change and/or that the course of the connection elements routed through the cable routing device does not change.

In another embodiment, at least one of the power converters, preferably both or all power converters, is/are arranged above the transformer. As was explained above, this can mean that the power converter is arranged above the transformer in the vertical direction. However this does not exclude the possibility of the power converter being arranged offset to the transformer in the transverse direction. It is nevertheless possible for only one part of a power converter or of the housing to be arranged above the transformer or above the transformer case or a part of it.

This advantageously results in a compact arrangement that is spatially easy to integrate into the rail vehicle.

Further proposed is a process for operating an electrical system according to one of the embodiments described in this disclosure. This process involves making or breaking an intermediate circuit electrical connection. In particular, the intermediate circuit electrical connection can be made or broken by opening or closing a switching device.

The making or breaking of the intermediate circuit electrical connection can be controlled, for example, by a controller, in particular a controller of the rail vehicle.

This has the advantageous result of reducing or even minimizing the limitation of the functionality of the rail vehicle in certain operating scenarios, especially in the case of certain failures. In particular, it can prevent or minimize a reduction in tractive power.

For example, the intermediate circuit electrical connection can be made if a predetermined operating scenario is detected, especially in the case of a certain failure. The intermediate circuit electrical connection can be broken if an operating scenario different from the predetermined operating scenario is detected. To accomplish this, the rail vehicle or the electrical system can comprise at least one means for detecting an operating state.

In another embodiment, the intermediate circuit electrical connection is made if an input power of an intermediate circuit section of a power converter deviates from a desired input power. The input power can deviate from a desired input power, for example, if the line current power converter of the power converter is defective. The input power can also deviate from a desired input power if a transformer connecting the electrical system to a supply voltage from a supply network is defective. For example, a secondary winding of the transformer connecting a power converter to the supply voltage can be defective.

In such a case, if the intermediate circuit electrical connection is not made, it can be necessary to turn off consumers connected to the power converter, especially electrical power plants, which in turn would reduce the tractive power provided for the rail vehicle.

However, making the intermediate circuit electrical connection can provide at least one part of the desired input power for the intermediate circuit section through the intermediate circuit connection.

Alternatively or cumulatively, the intermediate circuit electrical connection is made if not all intermediate circuit sections of the power converters connectable through the intermediate circuit connection are electrically connected with an energy source if an intermediate circuit connection is not made.

In particular, only the intermediate circuit section of one power converter of the at least two power converters connectable through the intermediate circuit connection can be electrically connected with an energy source. An intermediate circuit section not being electrically connected with an energy source can include the case in which the intermediate circuit section is not connected with an energy source in a desired way. In such a case, it is possible that the input power of an intermediate circuit section of a power converter also deviates from a desired input power.

In particular, the energy source can be the explained supply network. That is, in this case not all the intermediate circuit sections of the power converters can be connected with the supply network, e.g., due to a defective line current power converter or transformer.

However, the energy source can alternatively also be an energy storage device, e.g., an accumulator, or a generator device. E.g., it is possible that the energy source is an energy source arranged in or on the rail vehicle. It is possible, for example, for an alternating current generator to be connected with the intermediate circuit section of the power converter through the line current power converter(s) of a power converter. Alternatively, an alternating current generator can be connected with the intermediate circuit section of the power converter through a power converter rectifier different from the line current power converter. Alternatively or cumulatively, it is possible, for example, for a direct current source, e.g., an accumulator, to be connected with the intermediate circuit section of the power converter through the line current power converter(s) of a power converter. Alternatively, the DC power source can be electrically connected with the intermediate circuit section directly, or through a DC converter that is different from the line current power converter.

It is possible, e.g., for an intermediate circuit section of only one power converter of the multiple power converters that are present to be electrically connected with an energy storage device or a generator device if this power converter or all power converters cannot be electrically connected to a supply voltage from a supply network. This can be the case, e.g., if a section of the line has no supply network with which a current collector can make contact. That is, in this case, electrical energy is not provided through the supply network, but rather through the energy storage device or the generator device.

In the case in which not all intermediate circuit sections of the power converters are connected with an energy source, in order to distribute the energy or power to all intermediate circuit sections, it is then possible to make the intermediate circuit connection.

For example, if electric power is transferred from the energy source into an intermediate circuit section of a first power converter that is connected with the energy source, part of this energy can then be transferred to another intermediate circuit section of another power converter through the intermediate circuit connection. Otherwise, without an intermediate circuit connection, it can be necessary to turn off the consumers connected to the first power converter, especially power plants, which in turn would reduce tractive power.

Alternatively or cumulatively, the intermediate circuit connection can be made if the currents through at least two secondary windings of the transformer deviate from one another by more than a predetermined amount. This results in an asymmetric load on the transformer windings. Such asymmetric loads can increase harmonic losses and produce interfering currents. Interfering currents can in turn affect the operational reliability of the rail vehicle, especially since they can have an undesirable effect on a supply network.

Currents through at least two secondary windings of the transformer can deviate from one another by more than a predetermined amount, for example, if a motor converter of a power converter is defective.

If the input power of an intermediate circuit of a power converter deviates from a desired input power by no more than a predetermined amount, and/or if currents through at least two secondary windings deviate from one another by no more than a predetermined amount, then the intermediate circuit electrical connection can be broken.

This has the advantageous result of minimizing or reducing the reduction in functionality of the rail vehicle that occurs in the case of a failure, especially the reduction in tractive power.

Figure 4A:
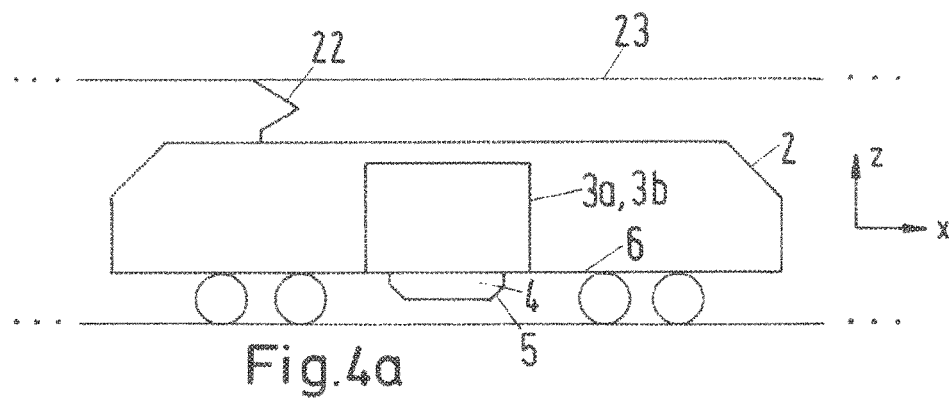
Figure 4B:
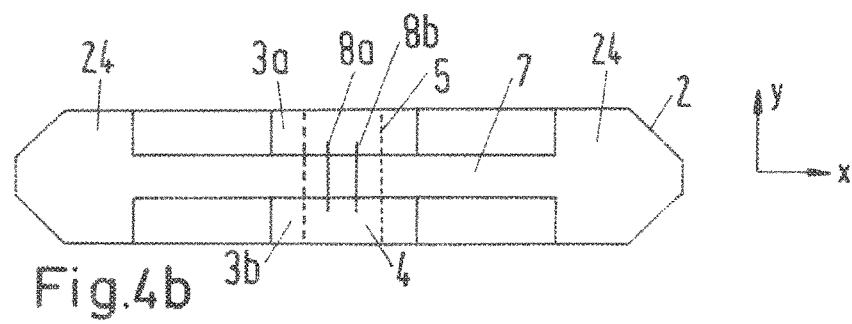

The invention is explained in detail on the basis of a sample embodiment: The figures are as follows:

FIG. 1 a perspective view of an inventive electrical system;

FIG. 2a a cross section through the electrical system shown in FIG. 1;

FIG. 2b a longitudinal section through the electrical system shown in FIG. 1;

FIG. 3 a schematic electrical circuit diagram of an inventive electrical system;

FIG. 4a a schematic longitudinal section through a rail vehicle;

FIG. 4b a schematic top view of the rail vehicle shown in FIG. 4a; and

Figure 5:
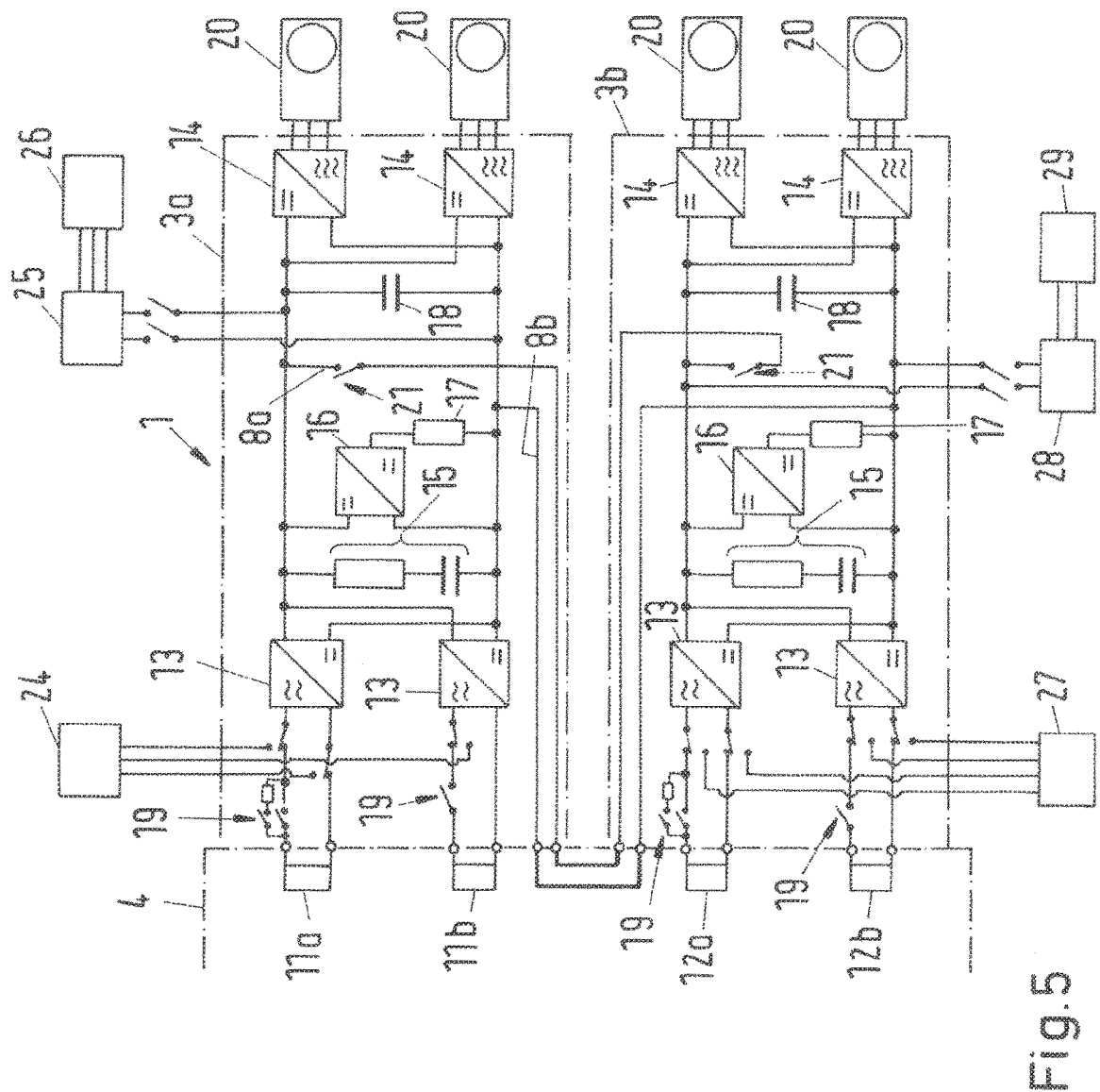

FIG. 5 a schematic electrical circuit diagram of another embodiment of an inventive electrical system.

In the discussion below, the same reference numbers are used for elements with the same or similar features.

FIG. 1 is a perspective view of an electrical system 1 of a rail vehicle 2 (see e.g., FIG. 4a). The electrical system 1 comprises a first power converter 3a and a second power converter 3b. For clarity, here only the housings of the power converters 3a, 3b are shown, without any other components of the power converters 3a, 3b. The electrical components and connections of the power converters 3a, 3b are explained in detail in reference to FIG. 3.

The electrical system 1 further comprises a transformer 4; once again, for clarity only a transformer case 5 is shown, without any other components of the transformer 4. For example, the primary and multiple secondary windings 11a, 11b, 12a, 12b of the transformer 4 are not shown (see FIG. 3).

FIG. 1 also shows a base plate 6 of the rail vehicle 2, the power converters 3a, 3b being arranged on a top of the base plate 6. The transformer 4 is arranged on the bottom of the base plate 6. FIG. 1 also shows a coordinate system, a first axis [x] being oriented parallel to a longitudinal axis of the rail vehicle 2, a second axis y being oriented parallel to a transverse axis of the rail vehicle 2, and a third axis z being oriented parallel to a vertical axis of the rail vehicle 2. The power converters 3a, 3b are shown arranged above the transformer 4 in the vertical direction z. The power converters 3a, 3b are arranged spaced apart from one another in the transverse direction y. This forms a central passage 7 between the power converters. In particular, power converters 3a, 3b can be arranged on opposite sides of the central passage.

FIG. 1 also shows a first intermediate circuit electrical connection 8a and a second intermediate circuit electrical connection 8b.

FIG. 1 also shows a first terminal 9a of the first power converter 3a for the first intermediate circuit electrical connection 8a and a second terminal 9b of the first power converter 3a for the second intermediate circuit electrical connection 8b. FIG. 1 also shows a first terminal 10a of the second power converter 3b for the first intermediate circuit electrical connection 8a and a second terminal 10b of the second power converter 3b for the second intermediate circuit electrical connection 8b. The first intermediate circuit electrical connection 8a and the first electrical terminals 9a, 10a of the power converters 3a, 3b can electrically connect high-voltage sections of intermediate circuit sections of the power converters 3a, 3b. The second intermediate circuit electrical connection 8b and the second electrical terminals 9b, 10b of the power converters 3a, 3b can electrically connect low-voltage sections of intermediate circuit sections of the power converters 3a, 3b.

The intermediate circuit electrical connections 8a, 8b are shown routed through the transformer case 5. In particular, the terminals 9a, 9b, 10a, 10b for the intermediate circuit electrical connections can be arranged on the bottoms of the power converters 3a, 3b, in particular on the bottoms of their housings or supporting structures. At least part of each of the intermediate circuit electrical connections 8a, 8b can be part of the transformer 4. These intermediate circuit connections 8a, 8b can make contact with the terminals 9a, 9b, 10a, 10b of the power converters 3a, 3b through a top of the transformer case 5.

Of course it is possible that the transformer 4 also has terminals for making contact with the terminals 9a, 9b, 10a, 10b of the power converters 3a, 3b.

FIG. 2a is a schematic cross section through the electrical system 1 shown in FIG. 1. In particular, it can be seen that the intermediate circuit electrical connections 8a, 8b are routed through the transformer case 5, beneath the central passage 7, in particular beneath the base plate 6, in order to bridge the distance from the power converters 3a, 3b along the second axis y (transverse axis).

FIG. 2b is a schematic longitudinal section through the electrical system 1 shown in FIG. 1. In particular, it can be seen that the intermediate circuit electrical connections 8a, 8b are routed through an interior volume of the transformer case 5, and thus are arranged in this interior volume.

The part of the interior volume of the transformer case 5 through which the intermediate circuit electrical connections 8a, 8b are routed can be a part that is filled with transformer oil. Thus, the intermediate circuit electrical connections 8a, 8b can be surrounded by transformer oil.

The intermediate circuit electrical connections 8a, 8b, especially the transformer-internal parts of these intermediate circuit connections 8a, 8b, are preferably in the form of current buses.

FIG. 3 is a schematic electrical circuit diagram of an inventive electrical system. In particular, FIG. 3 shows a transformer 4, a first power converter 3a, and another power converter 3b.

The transformer 4 comprises secondary windings 11a, 11b, 12a, 12b. Two secondary windings 11a, 11b are electrically connected with input terminals of the first power converter 3a. Two other secondary windings 12a, 12b are connected with input terminals of the second power converter 3b.

Each of the power converters comprises two line current power converters 13 and two drive power converters 14. The direct voltage terminals of the line current power converters 13 and the direct voltage terminals of the drive power converters 14 have an intermediate circuit section of the power converters 3a, 3b arranged between them.

The power converters also have filter devices 15, a braking controller 16, and a braking resistor 17. Each power converter 3a, 3b also has an intermediate circuit capacitor 18.

A first terminal of the capacitor 18 is connected with a high-voltage section of the intermediate circuit section, and another terminal of the intermediate circuit capacitor 18 is connected with a low voltage section of the intermediate circuit section.

This figure also shows that each of the power converters 3a, 3b comprises a disconnecting switch or changeover switch 19, which electrically connects the line current power converters 13 with the secondary windings 11a, 11b, 12a, 12b. In the case of changeover switches 19, alternating voltage terminals of the line current power converters 13 can be electrically connected with a alternating voltage source (not shown), for example a generator, especially a diesel generator, or another external energy supply device, instead of with the secondary windings 11a, 11b, 12a, 12b of the transformer 4.

This figure also shows electrical power plants 20, which are connected with alternating voltage terminals of the drive power converters 14.

The line current power converters 13 can comprise, in particular, electrical or electronic switching elements, especially IGBTs. Furthermore, the line current power converters 13 can be operated as switched step-up converters or rectifiers. In particular, the line current power converters 13 supply energy to the intermediate circuit section. The line current power converters 13 can also be operated as rectifiers if a generator device is connected to the alternating voltage connections of the line current power converters 13. Depending on the operating point, the line current power converters 13 can transfer energy in all directions, i.e., from the transformer 4 to the power plants 20 or from the power plants 20 to the transformer.

In a direct current system, a line current power converter 13 can be operated as a 2-quadrant step-up or step-down converter. The latter can also transport energy in both directions. In the same way, the line current power converter 13 can, in this case, connect an external energy storage device, for example a battery (not shown).

The drive power converters 14 can also comprise electrical or electronic switching elements, for example IGBTs. The drive power converters 14 generate a frequency and voltage-controlled three-phase current for operating the power plants 20.

Not shown is a connection of the power converters 3a, 3b for auxiliaries and an auxiliary converter.

This figure also shows a first intermediate circuit electrical connection 8a and a second intermediate circuit electrical connection 8b. The first intermediate circuit electrical connection 8a has a switching element 21.

The figure further shows that each intermediate circuit connection 8a, 8b comprises power converter-internal parts or sections, which are arranged in a housing of the power converters 3a, 3b. Every intermediate circuit connection 8a, 8b also has a transformer-internal part or section, which is arranged in the transformer case 5. The figure further shows that the intermediate circuit connection 8a, 8b has no parts that are arranged outside of a housing of the power converters 3a, 3b and outside of the transformer case 5.

The intermediate circuit electrical connection 8a, 8b between the intermediate circuits of the power converters 3a, 3b can be made or broken by the switching elements 21. These switching elements 21 can be arranged in a power converter-internal part of the first intermediate circuit connection 8a, 8b. In particular, this connection can be made or broken depending on detected operating scenarios.

Not shown is a controller for controlling the switching elements 21.

FIG. 4a is a schematic longitudinal section through a rail vehicle 2, in particular a locomotive. It shows a current collector 22, which can electrically connect a primary winding (not shown) of a transformer 4 (see, e.g., FIG. 4) with a high-voltage line 23 of a supply network.

This figure further shows the transformer 4 with the transformer case 5 and power converters 3a, 3b of the rail vehicle 2. Thus, the rail vehicle 2 comprises an electrical system, as is shown in FIG. 1.

This figure further shows a base plate 6 of the rail vehicle 2. Thus, it can be seen that the transformer 4 is fastened to the rail vehicle 2 in an underfloor arrangement.

FIG. 4b is a schematic top view of a vehicle interior of the rail vehicle 2 from FIG. 4a. This figure shows engineer's cabins 24, which are located at the ends of the rail vehicle 2 along the first axis x. The engineer's cabins 22 are connected by a central passage 7 that extends in the longitudinal direction x. The central passage has the power converters 3a, 3b arranged next to it in the transverse direction y. This figure also shows a transformer 4 with a transformer case 5 in dashed lines. This figure also shows intermediate circuit electrical connections 8a, 8b.

FIG. 5 is a schematic electrical circuit diagram of another embodiment of the inventive electrical system.

As is also shown in FIG. 3, the intermediate circuit sections of the power converters 3a, 3b can be electrically connected with a supply network through the line current power converter 13 and the transformer 4.

In contrast to the embodiment shown in FIG. 3, FIG. 5 shows a number of other energy sources, which can electrically connect the intermediate circuit sections of the power converters 3a, 3b.

For instance, the intermediate circuit section of the first power converter 3a can be connected, through the line current power converter 13 and corresponding switching elements, with an alternating current generator 24, which forms an energy source.

Alternatively or cumulatively, the intermediate circuit section of the first power converter 3a can be connected, through a rectifier 25 and corresponding switching elements, with another alternating current generator 26, which also forms an energy source.

Also alternatively or cumulatively, the intermediate circuit section of the other power converter 3b can be connected, through the line current power converters 13 and corresponding switching elements, with an accumulator 27, this other accumulator 27 also forming an energy source.

Also alternatively or cumulatively, the intermediate circuit section of the other power converter 3b can be connected, through corresponding switching elements and a DC-DC converter 28, with another accumulator 29, which also forms an energy source.

Here embodiments are conceivable in which only the intermediate circuit section of the first power converter 3a can be connected with one or more such energy sources 24, 26, 27, 29. Embodiments are also conceivable in which only the intermediate circuit section of the other power converter 3b can be connected with one or more such energy sources 24, 26, 27, 29.

These energy sources 24, 26, 27, 29 can be vehicle-side-mounted energy sources.

If, e.g., in a corresponding operating scenario, only the intermediate circuit section of one of the power converters 3a, 3b is electrically connected with one or more energy sources 24, 26, 27, 29, then the intermediate circuit electrical connection 8a, 8b can be made.

LIST OF REFERENCE NUMBERS

1 Electrical system
2 Railroad vehicle
3a, 3b Power converter
4 Transformer
5 Transformer case
6 Base plate
7 Central passage
8a, 8b Intermediate circuit electrical connections
9a, 9b Electrical terminals
10a, 10b Electrical terminals
11a, 11b Secondary winding of the transformer
12a, 12b Secondary winding of the transformer
13 Line current power converter
14 Drive power converter
15 Filter device
16 Braking controller
17 Braking resistor
18 Intermediate circuit capacitor
19 Switching elements
20 Power plants
21 Switching element
22 Current collector
23 High-voltage line
24 Alternating current generator
25 Rectifier
26 Other alternating current generator
27 Accumulator
28 DC-DC converter
29 Other accumulator

The invention claimed is:

1. An electrical system of a rail vehicle, the electrical system comprising a first power converter, at least one other power converter, and at least one transformer, wherein an intermediate circuit section of the first power converter is electrically connectable, by at least one intermediate circuit electrical connection, with an intermediate circuit section of the at least one other power converter, at least one part of the electrical intermediate circuit connection being routed through a transformer case.

2. The electrical system according to claim 1, wherein at least one part of the intermediate circuit electrical connection is in the form of a current bus.

3. The electrical system according to claim 1, wherein at least one part of the intermediate circuit electrical connection is in the form of a cable.

4. The electrical system according to claim 3, wherein at least one part of the intermediate circuit electrical connection is electrically insulated.

5. The electrical system according to claim 1, wherein at least one part of the intermediate circuit electrical connection is surrounded by an insulating material of the transformer.

6. The electrical system according to claim 5, wherein the insulating material is a transformer oil.

7. A rail vehicle, wherein the rail vehicle has an electrical system according to claim 1.

8. The rail vehicle according to claim 7, wherein the first power container and the at least one other power converter are arranged spaced apart from one another in at least one spatial direction, at least one part of the transformer being arranged between the first and the at least one other power converter in the at least one spatial direction.

9. The rail vehicle according to claim 7, wherein the rail vehicle has or forms a central passage, the transformer being arranged beneath the central passage.

10. The rail vehicle according to claim 9, wherein at least one cable routing device is arranged between a floor element of the central passage and a top of the transformer, the cable routing device lying flush against the floor element and against the top of the transformer.

11. The rail vehicle according to claim 7, wherein at least one of the power converters is arranged above the transformer.

12. A process for operating an electrical system according to claim 1, wherein an intermediate circuit electrical connection is made or broken.

13. The process according to claim 12, wherein the intermediate circuit electrical connection is made if an input power of an intermediate circuit section of a power converter deviates from a desired input power, and/or if not all intermediate circuit sections of the connectable power converters are electrically connected with an energy source when an intermediate circuit connection is not made, and/or if the currents through at least two secondary windings of the transformer deviate from one another by more than a predetermined amount.

* * * * *

UNITED STATES PATENT AND TRADEMARK OFFICE
CERTIFICATE OF CORRECTION

PATENT NO. : 10,857,888 B2
APPLICATION NO. : 16/305269
DATED : December 8, 2020
INVENTOR(S) : Ewald Falke et al.

Page 1 of 1

It is certified that error appears in the above-identified patent and that said Letters Patent is hereby corrected as shown below:

In the Claims

Column 13, Line 6, Claim 8, delete "container" and insert -- converter --

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*